(12) United States Patent
Ruzza (10) Patent No.: US 11,913,201 B2
(45) Date of Patent: Feb. 27, 2024

(54) CONTROL DEVICE FOR A WATER SUPPLY PLUMBING FIXTURE

(71) Applicant: ALMAR S.R.L., Varese (IT)

(72) Inventor: Stefano Ruzza, Varese (IT)

(73) Assignee: ALMAR S.R.L., Gavirate (IT)

( * ) Notice: Subject to any disclaimer, the term of this patent is extended or adjusted under 35 U.S.C. 154(b) by 49 days.

(21) Appl. No.: 17/777,600

(22) PCT Filed: Sep. 2, 2020

(86) PCT No.: PCT/IB2020/058157
§ 371 (c)(1),
(2) Date: May 17, 2022

(87) PCT Pub. No.: WO2021/111199
PCT Pub. Date: Jun. 10, 2021

(65) Prior Publication Data
US 2023/0023445 A1 Jan. 26, 2023

(30) Foreign Application Priority Data
Dec. 5, 2019 (IT) .......................... 102019000023121

(51) Int. Cl.
*E03C 1/04* (2006.01)
*E03C 1/02* (2006.01)
*F16K 11/00* (2006.01)

(52) U.S. Cl.
CPC ............ *E03C 1/0408* (2013.01); *E03C 1/023* (2013.01); *F16K 11/00* (2013.01)

(58) Field of Classification Search
CPC ......... E03C 1/0408; E03C 1/023; E03C 1/042
See application file for complete search history.

(56) References Cited

U.S. PATENT DOCUMENTS 9,376,790 B2 * 6/2016 Sharratt .................. E03C 1/023
9,650,768 B2 * 5/2017 Johnson ................ E03C 1/0408
(Continued)

FOREIGN PATENT DOCUMENTS

| DE | 19622368 A1 | 12/1997 |
| EP | 3067601 A2 | 9/2016 |
| WO | 2018130708 A1 | 7/2018 |

OTHER PUBLICATIONS

European Patent Office, International Search Report issued in PCT/IB2020/058157, dated Nov. 13, 2020, Rijswijk, NL.
(Continued)

*Primary Examiner* — Michael R Reid
(74) *Attorney, Agent, or Firm* — Ferguson Case Orr Paterson (57) ABSTRACT

A command device for a water supply plumbing fixture that extends along a main axis and has a base group fluidically connectable to at least one inlet line and to supply lines, and an activation and regulation group engaged with the base group is provided. The activation and regulation group has a plurality of activation members configurable in an active configuration and a passive configuration in which the activation members respectively allow or prevent passage of water to a respective supply line, and a regulation member having an annular adjustment crown angularly rotatable, the activation members being housed at least in part within the adjustment crown, and a valve element, housed at least in part inside the adjustment crown, engaged with the base group and with the adjustment crown, so that each angular position of the adjustment crown corresponds to a respective configuration of the valve element.

18 Claims, 10 Drawing Sheets

(56) References Cited

U.S. PATENT DOCUMENTS

| | | |
|---|---|---|
| 10,745,896 B2 * | 8/2020 | Ye .................... E03C 1/0408 |
| 2017/0067236 A1 | 3/2017 | Vu |
| 2018/0313066 A1 | 11/2018 | Ye et al. |

OTHER PUBLICATIONS

European Patent Office, International Written issued in PCT/IB2020/058157, dated Nov. 13, 2020.

\* cited by examiner

CONTROL DEVICE FOR A WATER SUPPLY PLUMBING FIXTURE

CROSS-REFERENCE TO RELATED APPLICATIONS

This application is a National Phase Application of PCT International Application No. PCT/IB2020/058157, having an International Filing Date of Sep. 2, 2020 which claims the benefit of priority to Italian Patent Application No. 102019000023121, filed Dec. 5, 2019, each of which is hereby incorporated by reference in its entirety.

FIELD OF THE INVENTION

The present invention relates to a command device for a water supply plumbing fixture. Furthermore, the present invention also relates to a water supply system, for a water supply plumbing fixture, in which such a system comprises said command device. In addition, the plumbing fixture comprising said command device is also contemplated.

In particular, the present invention relates to the field of plumbing systems. Such systems are typically embedded in the walls delimiting the room, typically the bathroom.

BACKGROUND OF THE INVENTION

Such systems are well known from the prior art, comprising lines and specific connectors and/or installation devices embedded in the walls by means of special masonry operations. Solutions for water supply systems are also known, comprising, in addition to the supply systems, other supply devices by means of which water is supplied, such as a showerhead or a hand shower.

Specifically, the context in which the present invention is placed is that related to water supply plumbing fixtures, and in particular the shower fixture.

From the prior art, solutions for water supply plumbing fixtures are well known, provided with command devices suitable to command the supply of water by means of a supply device and modulate the intensity thereof.

For example, command devices by means of which a user decides through which water supply device the water has to be supplied or how the water has to be supplied by means of the same multi-function water supply device are known.

Solutions for command devices by means of which the intensity, i.e. the flow rate, of the water jet is modulated are also known.

From the prior art, device solutions are known, in which said functions, although present, are distinct, comprising special command groups for activating a type of supply at the expense of, or simultaneously with, another, and special regulation groups suitable to modulate the intensity of the supply.

SUMMARY OF THE INVENTION

It is the object of the present invention to provide a command device solution which combines the aforesaid functions in a single element. Therefore, it is the object of the present invention to provide a command device that is simple and effective to use, thus obviating the need for the user to have to use two distinct components and to have to perform two distinct operations.

Such an object is achieved by a command device, a water supply system and a water supply plumbing fixture as described and claimed herein. Preferred embodiments are also described.

BRIEF DESCRIPTION OF THE DRAWINGS

The features and advantages of the present invention will become apparent from the following description, given by way of non-limiting example, in accordance with the accompanying figures, in which.

DETAILED DESCRIPTION

Figure 1:
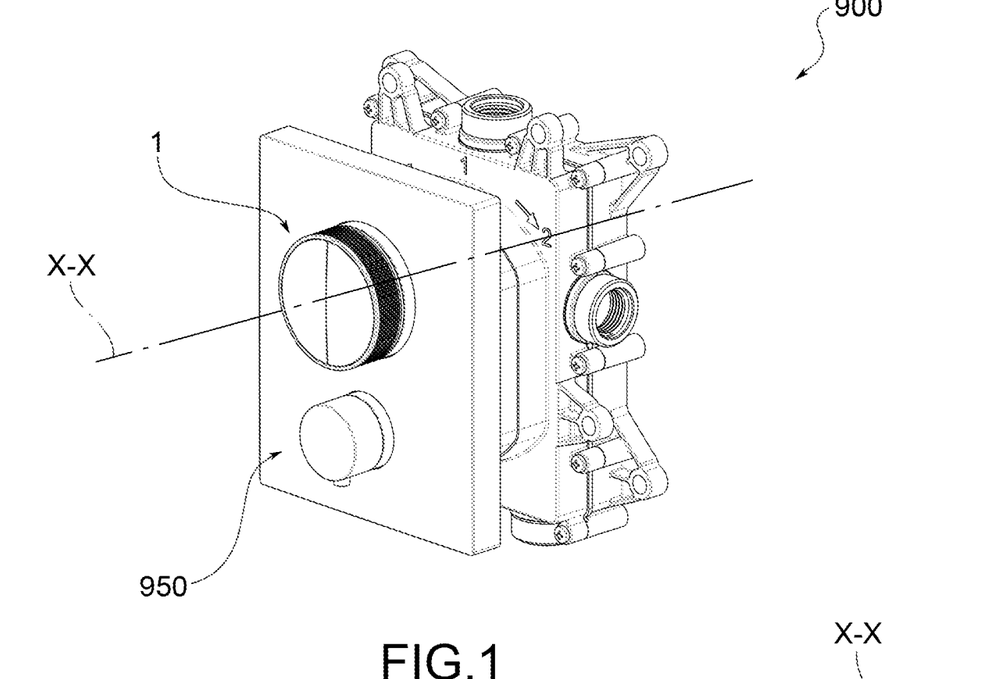
FIGS. 1 and 1a depict a perspective view and a perspective view with separate parts, respectively, of a supply system according to the present invention, in accordance with a preferred embodiment.
Figure 1A:
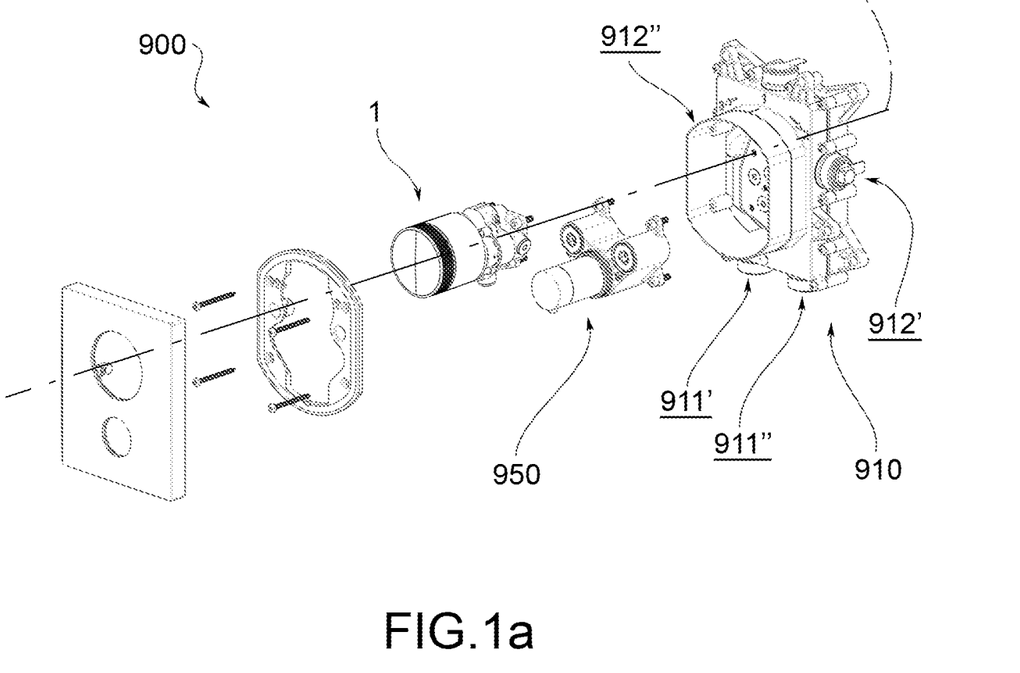
Figure 2:
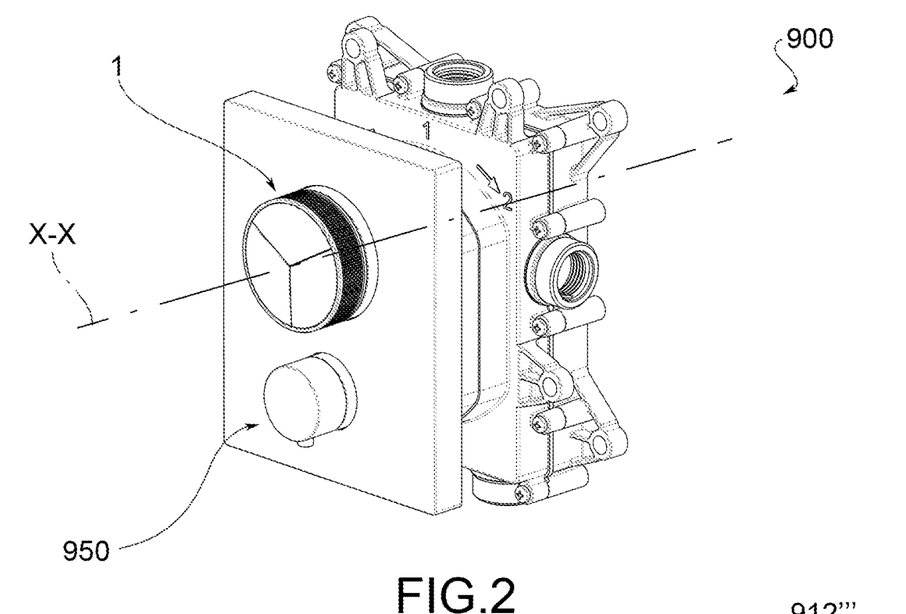
FIGS. 2 and 2a depict a perspective view and a perspective view with separate parts, respectively, of a supply system according to the present invention, in accordance with a further preferred embodiment.
Figure 2A:
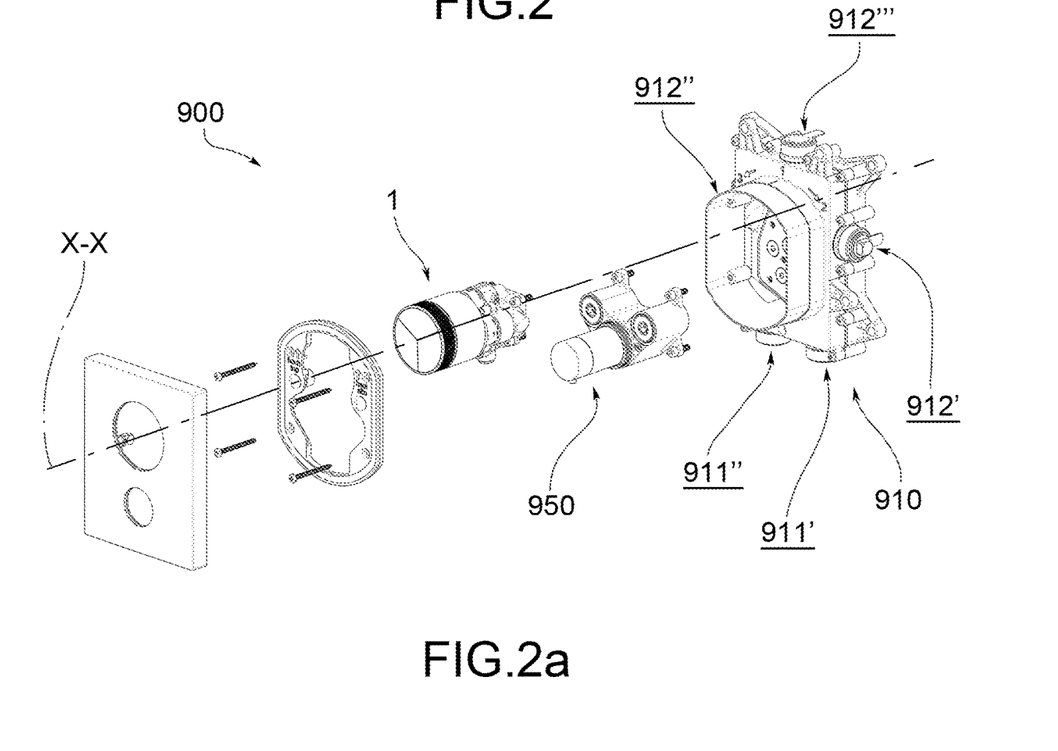
Figure 3:
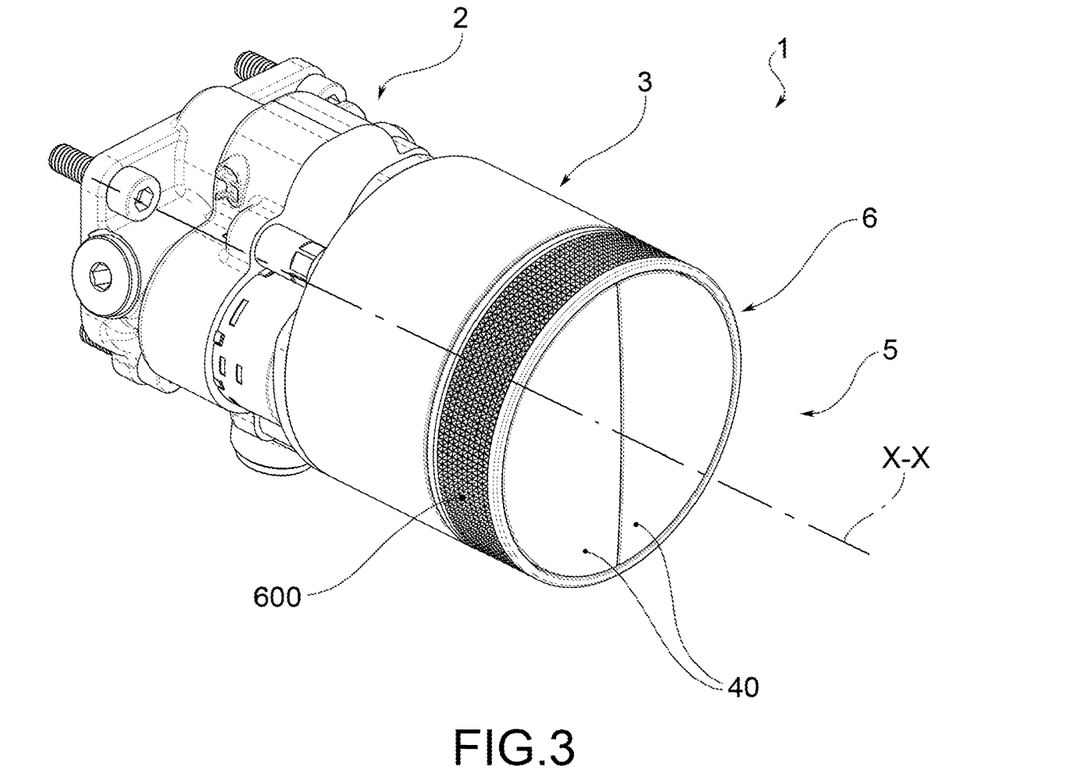
FIGS. 3 and 3' illustrate a perspective view and a rear view of the command device in FIGS. 1 and 1a, respectively.
Figure 4:
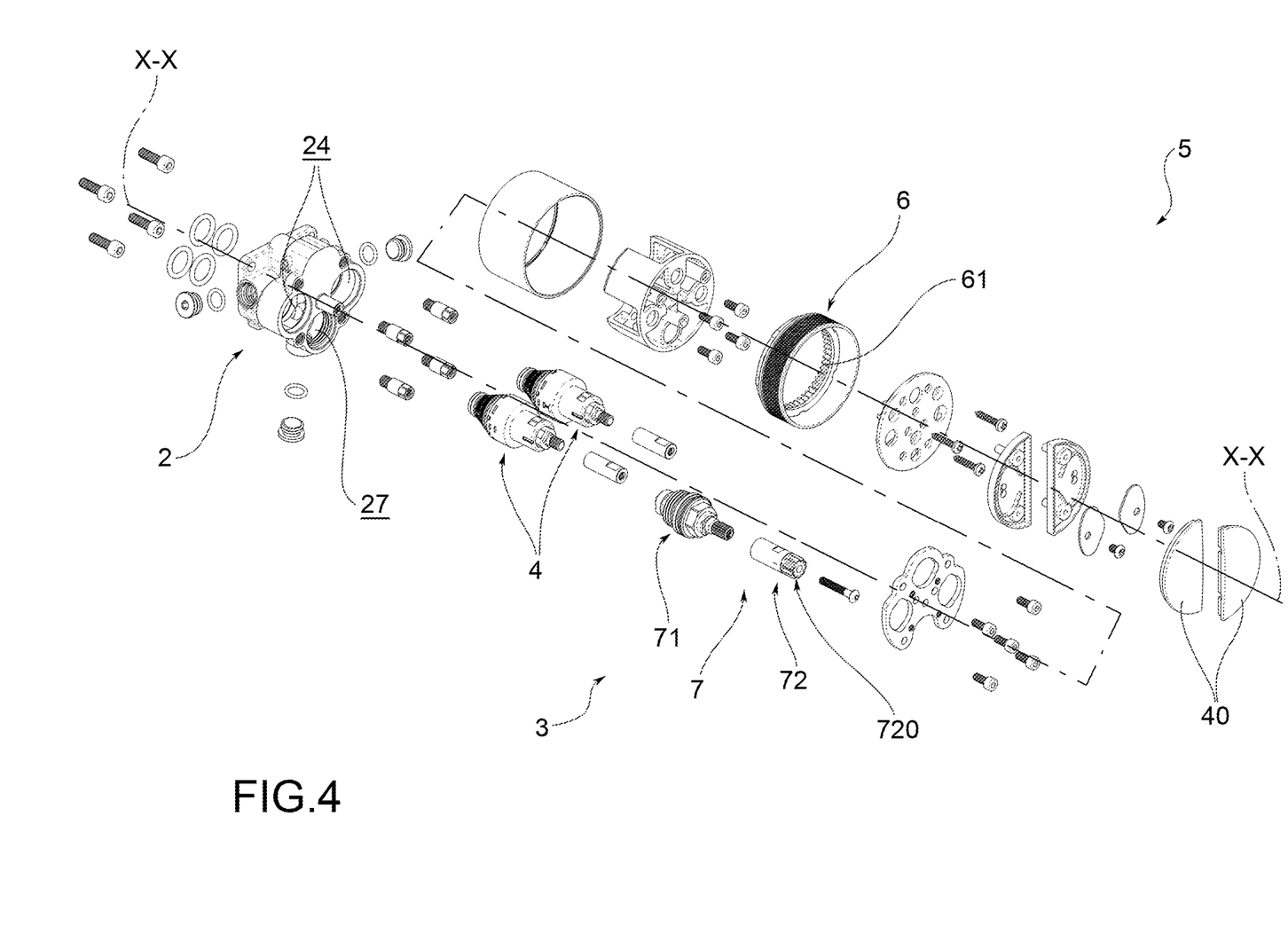
FIG. 4 shows a perspective view with separate parts of the command device in FIG. 3.
Figure 4A:
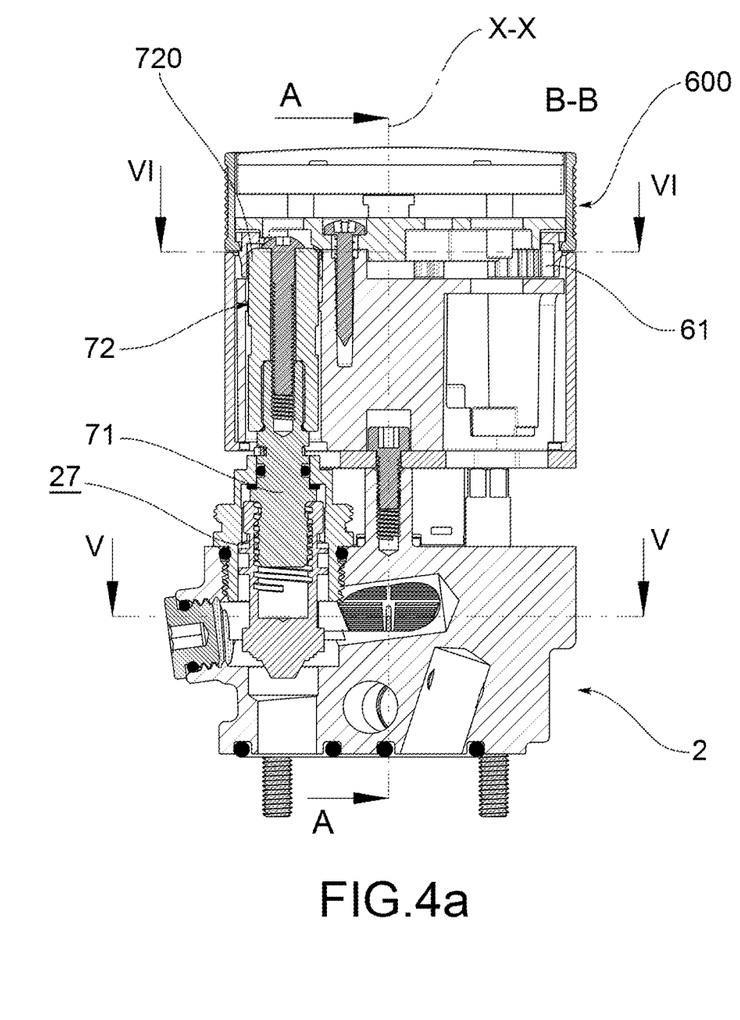
FIGS. 4a and 4b depict two longitudinal sectional views of the command device in FIG. 3.
Figure 4B:
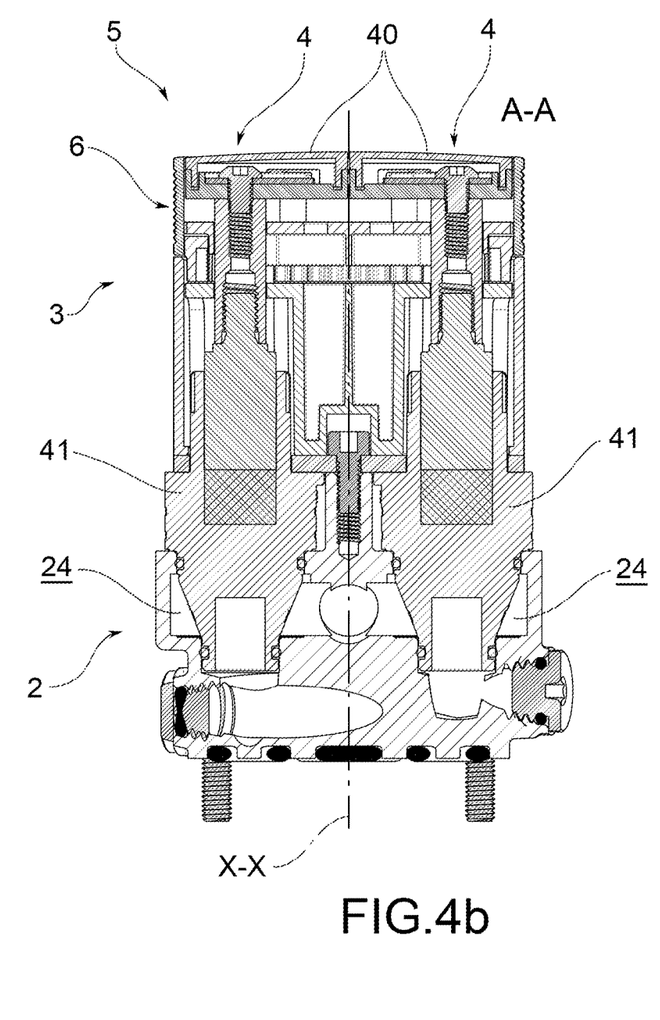
Figure 4C:
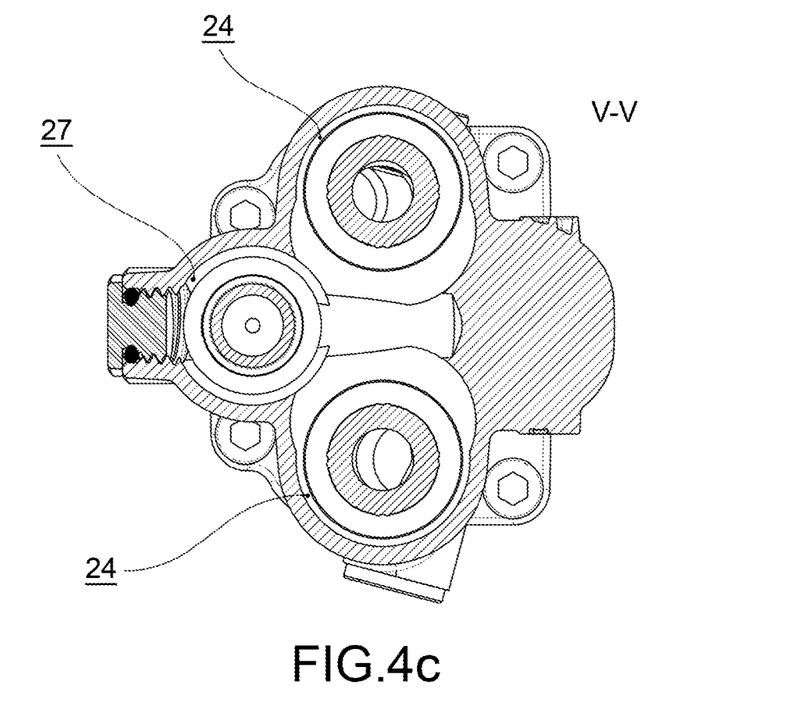
FIGS. 4c and 4d illustrate two cross-sectional views of the command device along the planes V-V and VI-VI in FIG. 4a, respectively.
Figure 4D:
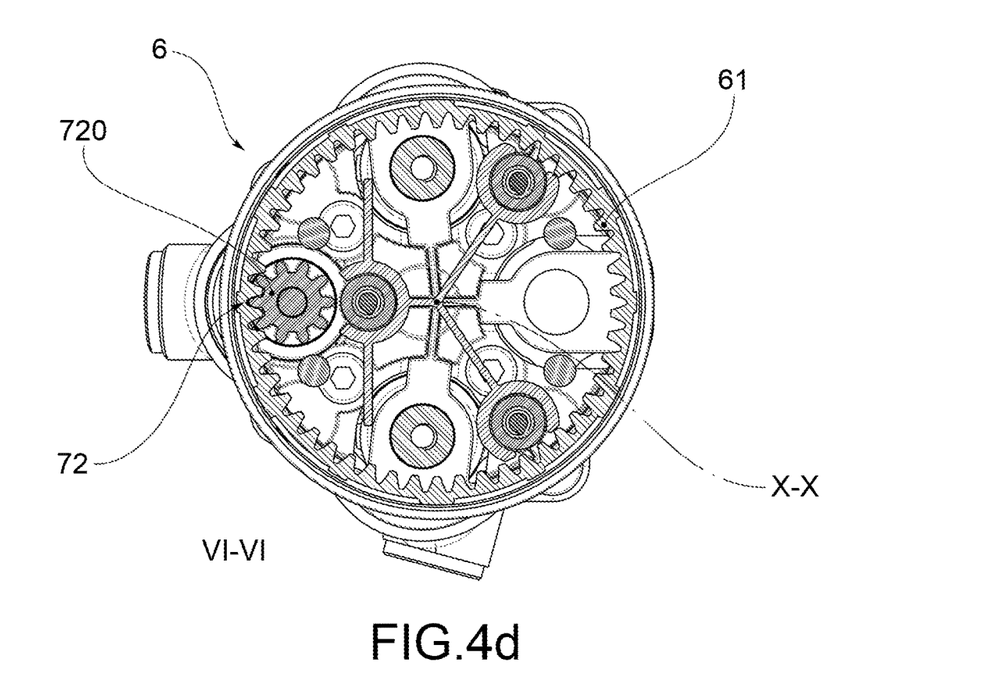
Figure 5:
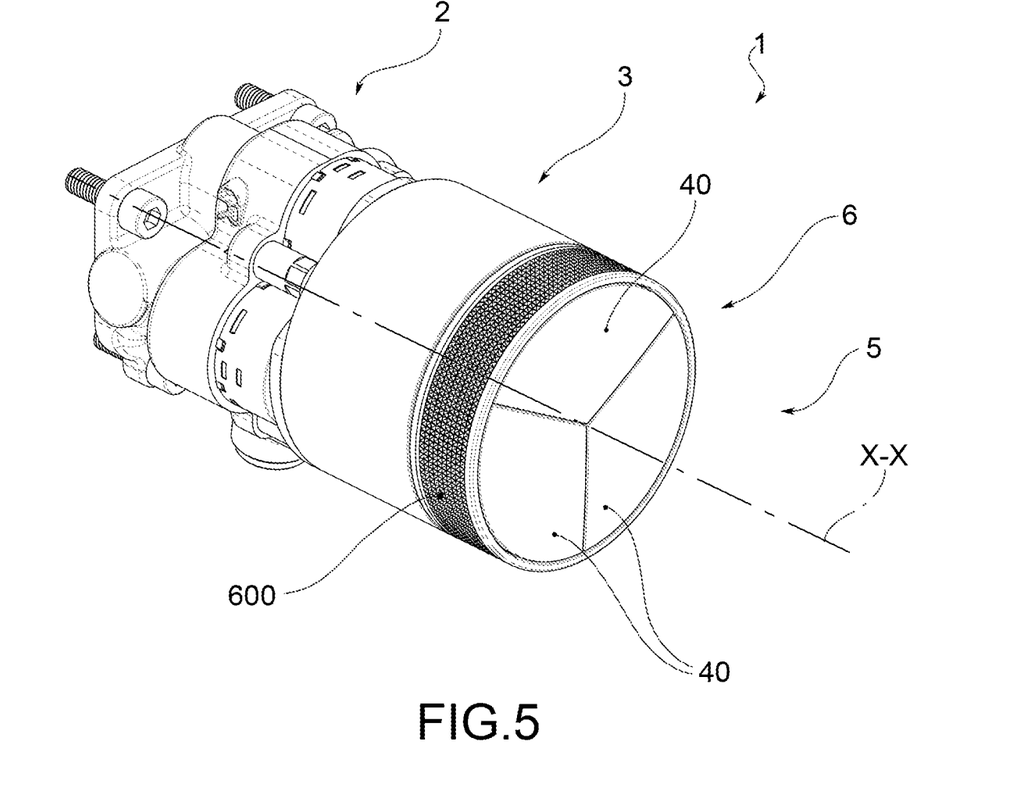
FIGS. 5 and 5' illustrate a perspective view and a rear view of the command device in FIGS. 2 and 2a, respectively.
Figure 6:
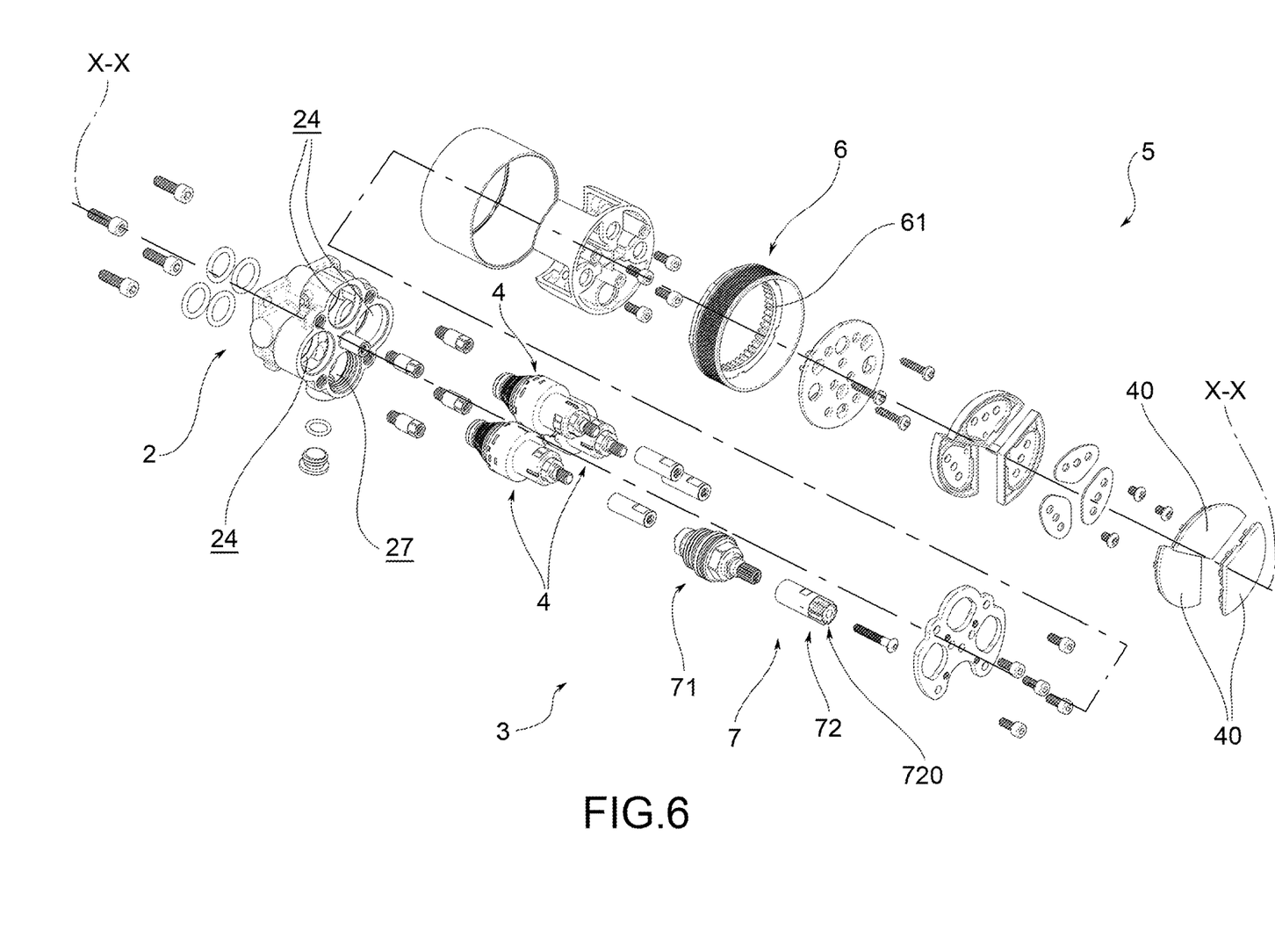
FIG. 6 shows a perspective view with separate parts of the command device in FIG. 5.
Figure 6A:
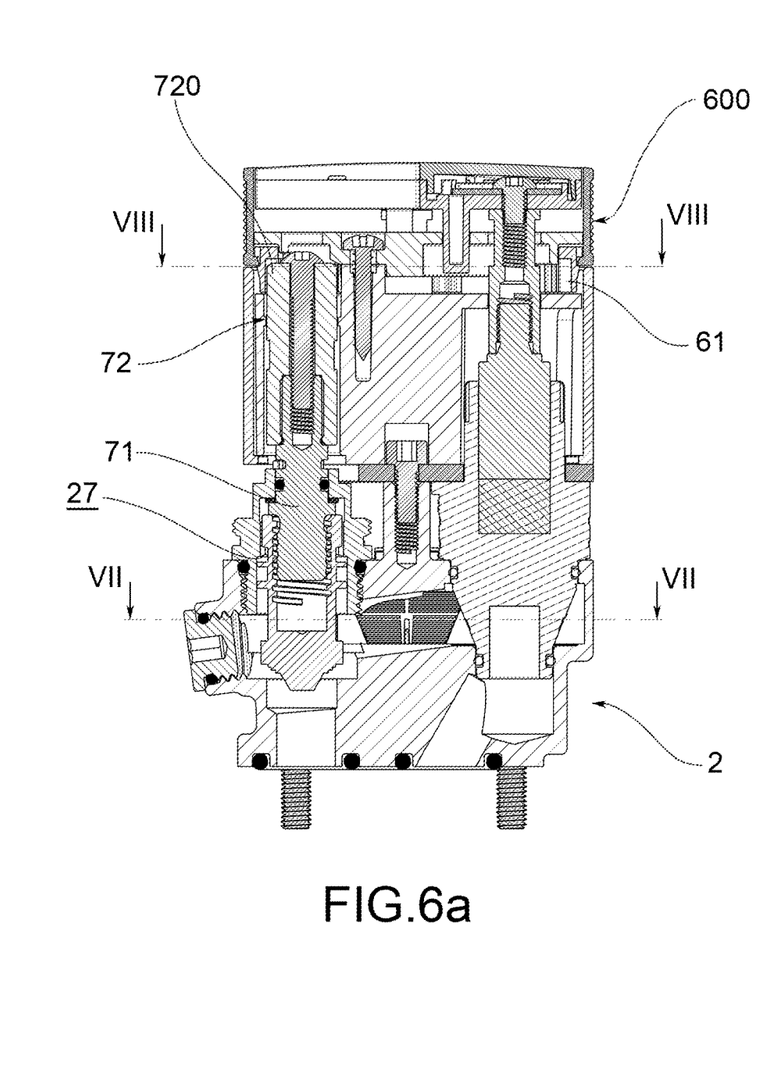
FIGS. 6a and 6b depict two longitudinal sectional views of the command device in FIG. 5.
Figure 6B:
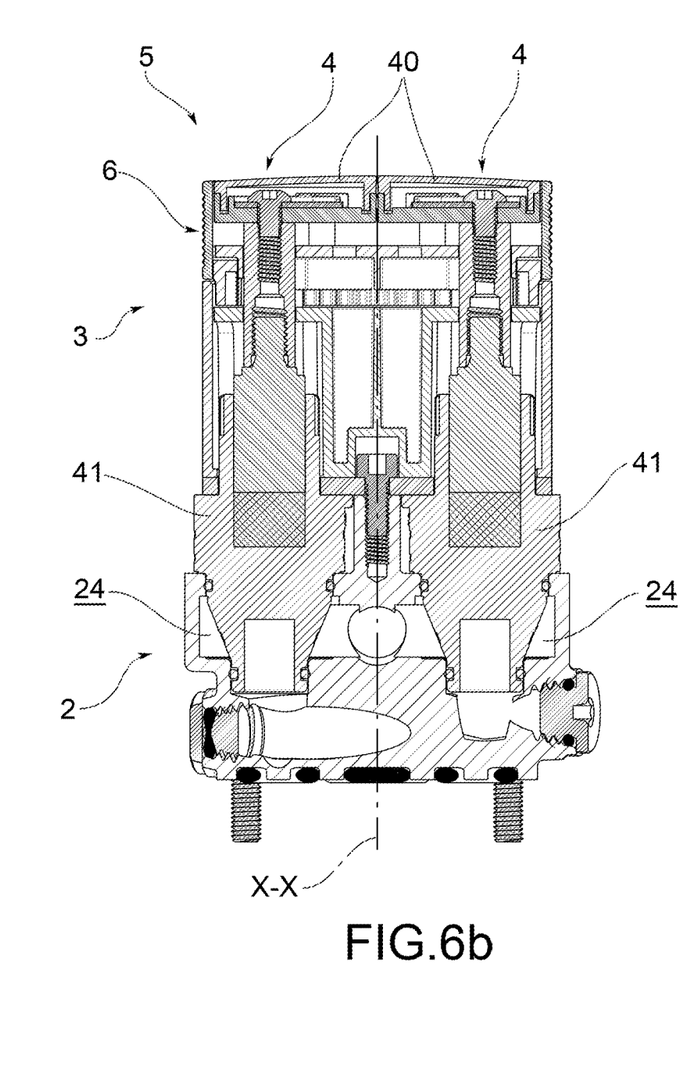
Figure 6C:
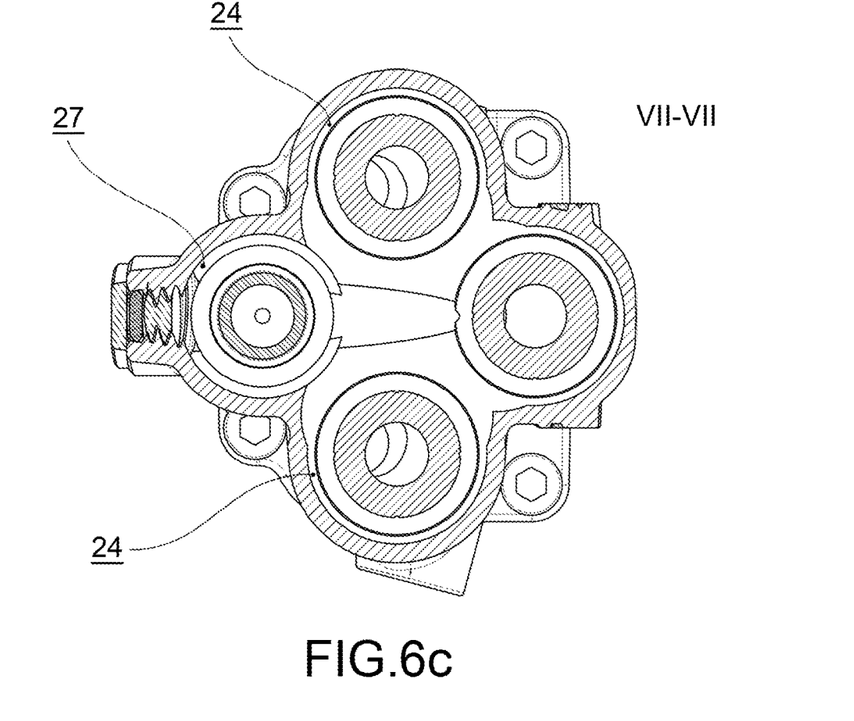
FIGS. 6c and 6d illustrate two cross-sectional views of the command device along the planes VII-VII and VIII-VIII in FIG. 6a, respectively.
Figure 6D:
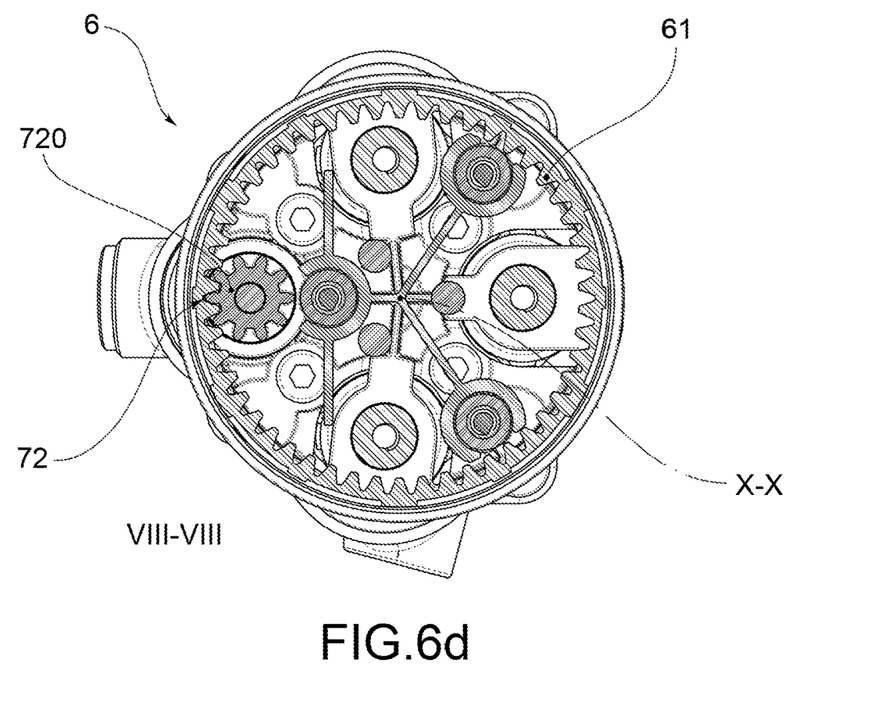

In accordance with the accompanying Figures, a command device according to the present invention is indicated by reference numeral 1 as a whole.

Furthermore, a water supply system comprising said command device 1, again according to the present invention, is indicated by reference numeral 900 as a whole.

The present invention also relates to a water supply plumbing fixture comprising said command device 1, and preferably comprising the water supply system 900 including the command device 1. The accompanying drawings do not show said water supply plumbing fixture.

In accordance with a preferred embodiment, the water supply fixture comprises at least one water supply device, such as a showerhead, for example, suitable to allow a multiplicity of types of supply, for example.

In accordance with a preferred embodiment, the water supply fixture comprises a plurality of water supply devices, such as a showerhead and a hand shower, for example.

In accordance with the present invention, the command device 1, and preferably the water supply system 900, are connectable to the lines included in the water supply plumbing fixture.

In particular, the water supply plumbing fixture comprises at least one inlet line and a plurality of supply lines, which are fluidically connectable to specific supply devices such as a showerhead and/or a hand shower. The water supply plumbing fixture preferably comprises a hot water inlet line and a cold water inlet line.

In accordance with the present invention, the command device 1 has a dual function: the first is to allow the user to command the water supply, i.e. to command the inflow, and the flow rate of water to be supplied by at least one supply device; the second is to allow the user to decide the supply modes, for example by choosing from a plurality of supply modes of the same supply device, or by choosing with which supply device be the water supplied.

According to the present invention, the command device 1 is included in a supply system 900 suitable to form part of the water supply plumbing fixture. In particular, the supply system 900 is fluidically connectable to the at least one water inlet line and fluidically connectable to the plurality of supply lines fluidically connected to the supply devices.

The supply system 900 preferably comprises at least one installation member fluidically connectable to the at least one inlet line and to the plurality of supply lines, wherein said installation member 910 is installable in a wall, for example by means of special masonry operations.

Preferably, the command device 1 is mountable and fluidically connectable to the installation member.

In accordance with a preferred embodiment, the water supply plumbing fixture comprises a hot water inlet line and a cold water inlet line, and the installation member 910 is fluidically connectable to the hot water inlet line and the cold water inlet line. Preferably, the supply system further comprises a mixing device 950 mountable and fluidically connectable to the installation member 910, so as to allow to mix the incoming water from the hot water inlet line and from the cold water inlet line. Preferably, the mixing device 950 is fluidically placed upstream of the command device 1.

Preferably, the mixing device 950 is a lever routable to a plurality of angular positions, each corresponding to a specific mixing of hot/cold water.

In accordance with a preferred embodiment, the installation member 910 is connectable to the respective fixture lines by means of special fluidic ports: for example, the installation member 910 comprises at least one inlet port 911', 911" and a plurality of supply ports 912', 912", 912'''.

The present invention is by no means limited to a particular feature of the installation member. Preferably, the installation member 910 substantially is a fluidic manifold within which specific fluidic segments and specific fluidic chambers are present.

According to a preferred embodiment, the command device 1 and the mixing device 950 extend parallel to each other in length, preferably orthogonally from the installation member 910.

In accordance with the present invention, the command device 1 has a main axis X-X. The command device 1 preferably extends along said main axis X-X in length.

According to the present invention, the command device 1 comprises a base group 2 fluidically connectable to the at least one inlet line and to said supply lines.

Preferably, the base group 2 is suitable to be mountable and fluidically connectable to the installation member 910 comprised in the supply system 900.

According to a preferred embodiment, the base group substantially is a fluidic manifold within which specific fluidic segments and specific fluidic chambers are present for the connection with the installation member 910.

Preferably, the base group 2 is a brass or brass alloy component.

Furthermore, according to the present invention, the command device 1 comprises an activation and regulation group 3 engaged with the base group 2. The activation and regulation group 3 is preferably mounted to the base group 2 along the main axis X-X.

In accordance with the present invention, the activation and regulation group 3 comprises a plurality of activation members 4 and a regulation member 5.

According to the present invention, the activation and regulation group 3 is suitable to allow the user to decide the water supply modes, choosing which supply device to use and adjusting the water flow rate, and therefore the jet intensity.

In accordance with the present invention, the activation members 4 allow the user to choose which supply device to use.

In accordance with the present invention, the regulation member 5 allows the user to adjust the water flow rate.

In accordance with the present invention, each activation member 4 extends substantially parallel to the main axis X-X and is configurable in an active configuration and a passive configuration in which it allows or prevents the passage of water to a respective supply line, respectively.

According to a preferred embodiment, in the active configuration, the respective activation member 4 allows the fluidic passage of water to a respective supply line. Instead, according to a preferred embodiment, in the passive configuration, the respective activation member 4 prevents the fluidic passage of water to a respective supply line.

In accordance with a preferred embodiment, each activation member 4 is configurable irrespective of the configuration of the other activation member 4.

In accordance with a preferred embodiment, the activation members 4 are positioned angularly equidistant with respect to the main axis X-X.

The command device 1 preferably comprises two activation members 4 positioned diametrically opposed to each other.

The command device 1 preferably comprises three activation members 4 positioned angularly equidistant from one another.

According to a preferred embodiment, each activation member 4 comprises a button 40 pressable by an operator to switch the configuration from the active configuration to the passive configuration.

In accordance with a preferred embodiment, each activation member 4 comprises an activation cartridge 41 engaged with the respective button 40. The activation cartridge 41 preferably comprises elastic elements suitable to allow the activation member to be activated/deactivated upon action on the button 40.

As mentioned, the activation and regulation group 3 comprises a special regulation member 5 suitable to allow the management of the water flow rate.

According to the present invention, the regulation member 5 comprises an angularly rotatable adjustment crown 6. In accordance with the present invention, each angular position of the adjustment crown 6 corresponds to a determined water flow rate.

In accordance with a preferred embodiment, the adjustment crown 6 starts from an angular starting position, corresponding to the minimum water flow rate, and ends at an angular arrival position, corresponding to the maximum water flow rate.

In accordance with the present invention, the adjustment crown 6 is concentric with respect to the main axis X-X.

According to a preferred embodiment, the activation members 4 are housed, at least in part, within said adjustment crown 6. In other words, the activation members 4 are positioned, at least in part, in the space region inside the adjustment crown 6.

Furthermore, in accordance with the present invention, the regulation member 5 comprises a valve element 7 engaged with the base group 2 and with the adjustment crown 6, so that each angular position of the adjustment crown 6 corresponds to a respective configuration of the valve element 7 corresponding to a consequent variation in the flow rate of the water flowing in the base group, i.e. between the at least one inlet line and the supply lines.

According to the present invention, the valve element 7 is also housed at least in part within said adjustment crown 6.

In accordance with a preferred embodiment, the base group 2 comprises a fluidic adjustment chamber 27, which is fluidically connectable to the at least one inlet line, in which a first end portion 71 of the valve element 7 is housed, wherein the valve element 7 comprises a second end portion 72 engaged with the adjustment crown 6. According to the position in which the end portion 71, housed in the fluidic adjustment chamber, is placed, a specific passage opening and thus a respective water flow rate are defined.

According to a preferred embodiment, the first end portion 71 sealingly engages the fluidic adjustment chamber 27.

In accordance with a preferred embodiment, the adjustment crown 6 comprises an annular toothing 61 facing the main axis X-X, and the valve element 7 comprises a toothed pin 720 engaged with said annular toothing 61. Said second end portion 72 preferably comprises said toothed pin 720.

In accordance with a preferred embodiment, the valve element 7 extends from the base group 2 substantially parallel to the main axis X-X.

Preferably, the valve element 7 is angularly positioned between two activation members 4.

In the embodiment with three activation members 4, the valve element 7 is positioned diametrically opposite to an activation member 4.

In accordance with a preferred embodiment, the base group 2 comprises a plurality of fluidic activation chambers 24 in which the activation members 4 are housed at least in part, where said fluidic activation chambers 24 are fluidically connected to the supply lines.

In accordance with a preferred embodiment, each activation member 4 is sealingly housed in the respective fluidic activation chamber 24.

In accordance with a preferred embodiment, the buttons 40 are specially shaped so that the inner space delimited by the adjustment crown 6 is filled with the plurality of buttons 40.

According to such an embodiment, the valve element 7 is axially covered by the buttons 40.

In accordance with a preferred embodiment, the activation members 4 and the valve element 7 are insertable and removable into/from the "cartridge" base group 2, through axial insertion operations.

Preferably, the activation members 4 and the valve element 7 are screwable into the base group 2.

According to a preferred embodiment, the adjustment crown 6 comprises an outer annular wall 600 with high friction. In other words, said outer annular wall 600 allows the user to grasp the adjustment crown 6 effectively, even with wet or even soapy hands. Said outer annular wall 600 preferably has rough, i.e. not smooth, portions, for example comprising a knurl or notches.

Innovatively, the command device for a water supply plumbing fixture, the water supply system for a water supply plumbing fixture, comprising said command device, and the plumbing fixture comprising said command device allow to achieve the set object.

Advantageously, the command device allows the water supply to be simply and efficiently activated/deactivated as well as the intensity thereof to be adjusted by activating a preferred supply device (which may be included in two distinct supply components, rather than in the same component).

Advantageously, the command device is simple and intuitive to use.

Advantageously, the command device has a highly compact size.

Advantageously, the command device has a highly pleasant and minimally invasive aesthetic impact (unlike, for example, the solutions known from the prior art in which there is a plurality of specific distinct elements for the activation/deactivation and the adjustment).

Advantageously, the command device of the present invention has a limited number of components.

Advantageously, the command device of the present invention is inexpensive to manufacture, produce and maintain.

Advantageously, the command device of the present invention is simple to install.

The aforesaid advantages described for the command device are also widely present in the supply system and in the plumbing fixture which comprise said command device.

It is apparent that, in order to meet contingent needs, those skilled in the art may make changes to the invention described above, all contained within the scope of protection defined by the following claims.

The invention claimed is:

1. A command device for a water supply plumbing fixture comprising a plurality of fixture lines comprising at least one inlet line and a plurality of supply lines fluidically connectable to specific supply devices, wherein the command device extends along a main axis (X-X) and comprises:
   a base group fluidically connectable to the at least one inlet line and to said supply lines; and
   an activation and regulation group engaged to the base group, the activation and regulation group comprising:
      a plurality of activation members that extend parallel to the main axis (X-X) and are configurable in an active configuration and a passive configuration in which the activation members respectively allow or prevent passage of water to a respective supply line; and
      a regulation member comprising:
         an adjustment crown annular with respect to the main axis (X-X), angularly rotatable, wherein said activation members are housed at least in part within said adjustment crown; and
         a valve element, housed at least in part inside said adjustment crown, engaged to the base group and to the adjustment crown, in such a way that each angular position of the adjustment crown corresponds to a respective configuration of the valve element corresponding to a consequent variation in flow rate of water flowing in the base group, namely between the at least one inlet line and the supply lines.

2. The command device of claim 1, wherein the base group comprises a fluidic adjustment chamber, fluidically connectable to the at least one inlet line, a first end portion of the valve element being housed in the fluidic adjustment chamber, and wherein the valve element comprises a second end portion engaged to the adjustment crown.

3. The command device of claim 1, wherein the adjustment crown comprises an annular toothing facing the main axis (X-X) and the valve element comprises a toothed pin engaged to said annular toothing.

4. The command device of claim 1, wherein the valve element extends from the base group parallel to the main axis (X-X).

5. The command device of claim 1, wherein the base group comprises a plurality of fluidic activation chambers in which the activation members are housed at least in part, and wherein said fluidic activation chambers are fluidically connected to the supply lines.

6. The command device of claim 1, wherein the activation members are positioned at an angle equidistant from the main axis (X-X).

7. The command device of claim 1, wherein each activation member of said plurality of activation members comprises a button pressable by an operator to switch from the active configuration to the passive configuration.

8. The command device of claim 7, wherein each activation member of said plurality of activation members comprises an activation cartridge engaged to a respective button, and wherein the activation cartridge comprises elastic elements configured to allow the activation member to be activated or deactivated by the respective button.

9. The command device of claim 7, wherein the buttons are shaped in such a way that an inner space delimited by the adjustment crown is filled with the buttons.

10. The command device of claim 1, comprising two activation members, positioned diametrically opposed.

11. The command device of claim 1, wherein said specific supply devices are showerheads or hand showers.

12. The command device of claim 1, comprising three angularly equidistant activation members.

13. A supply system of a water supply plumbing fixture comprising at least one inlet line and a plurality of supply lines, fluidically connectable to specific supply devices, wherein the system comprises:
 an installation member, fluidically connectable to the at least one inlet line and to the plurality of supply lines, wherein said installation member is installable in a wall; and
 a command device extending along a main axis (X-X) and comprising:
  a base group fluidically connectable to the at least one inlet line and to said supply lines; and
  an activation and regulation group engaged to the base group, the activation and regulation group comprising:
   a plurality of activation members that extend parallel to the main axis (X-X) and are configurable in an active configuration and a passive configuration in which the activation members respectively allow or prevent passage of water to a respective supply line; and
   a regulation member comprising:
    an adjustment crown annular with respect to the main axis (X-X), angularly rotatable, wherein said activation members are housed at least in part within said adjustment crown; and
    a valve element, housed at least in part inside said adjustment crown, engaged to the base group and to the adjustment crown, in such a way that each angular position of the adjustment crown corresponds to a respective configuration of the valve element corresponding to a consequent variation in flow rate of water flowing in the base group, namely between the at least one inlet line and the supply lines, wherein the command device is mountable and fluidically connectable to the installation member by the base group.

14. The supply system of claim 13, wherein said water supply plumbing fixture comprises a hot water inlet line and a cold water inlet line, wherein the installation member is fluidically connectable to the hot water inlet line and the cold water inlet line, and wherein the supply system further comprises:
 a mixing device mountable and fluidically connectable to the installation member to allow mixing of water incoming from the hot water inlet line and from the cold water inlet line.

15. The supply system of claim 14, wherein the command device and the mixing device extend in length parallel to each other.

16. A water supply plumbing fixture, comprising:
 at least one inlet line;
 a plurality of supply lines, fluidically connectable to specific supply devices; and
 a supply system in accordance with claim 13.

17. The supply system of claim 13, wherein said specific supply devices are showerheads or hand showers.

18. The supply system of claim 14, wherein the command device and the mixing device extend orthogonally from the installation member.

* * * * *